(12) United States Patent
Justyna et al.

(10) Patent No.: US 10,854,164 B1
(45) Date of Patent: Dec. 1, 2020

(54) GENERATING VISUAL INDICATORS REPRESENTING COMPLEXITY OF PROCESSES

(71) Applicant: Dell Products L.P., Round Rock, TX (US)

(72) Inventors: Piotr Justyna, Dublin (IE); Dabier F. Zigre, Dublin (IE); Michael Murphy, Sandyford (IE)

(73) Assignee: Dell Products L.P., Round Rock, TX (US)

( * ) Notice: Subject to any disclaimer, the term of this patent is extended or adjusted under 35 U.S.C. 154(b) by 14 days.

(21) Appl. No.: 15/879,601

(22) Filed: Jan. 25, 2018

(51) Int. Cl.
| G09G 5/00 | (2006.01) |
| G06T 11/00 | (2006.01) |
| G06Q 30/06 | (2012.01) |
| G06T 11/20 | (2006.01) |
| G06F 3/14 | (2006.01) |
| G09G 5/02 | (2006.01) |

(52) U.S. Cl.
CPC .............. *G09G 5/003* (2013.01); *G06F 3/14* (2013.01); *G06Q 30/0601* (2013.01); *G06T 11/001* (2013.01); *G06T 11/203* (2013.01); *G09G 5/026* (2013.01)

(58) Field of Classification Search
CPC .......... G09G 5/003; G06F 3/14; G06T 11/001
USPC ........................................................ 345/589
See application file for complete search history.

(56) References Cited

U.S. PATENT DOCUMENTS

| 6,127,616 A | 10/2000 | Yu | |
| 2006/0262975 A1 | 11/2006 | Gyu | |
| 2011/0173097 A1* | 7/2011 | McKee | ................ G06Q 10/087 705/27.1 |
| 2013/0345980 A1* | 12/2013 | van Os | .............. G01C 21/3626 701/538 |
| 2014/0208253 A1* | 7/2014 | Pettus | ................. G06F 3/04847 715/772 |
| 2015/0234974 A1 | 8/2015 | Dechene et al. | |

\* cited by examiner

*Primary Examiner* — Hai Tao Sun
(74) *Attorney, Agent, or Firm* — Ryan, Mason & Lewis, LLP

(57) ABSTRACT

A method includes identifying one or more processes presented on a display of a given client device and determining a complexity of at least a given one of the one or more processes, wherein determining the complexity of the given process comprises determining a number of tasks of the given process. The method also includes generating a given visual indicator of the complexity of the given process, the given visual indicator comprising a shape with a number of features based on the number of tasks of the given process. The method further includes providing the given visual indicator for presentation on the display of the given client device in association with the given process. The given visual indicator may further comprise at least one of a color blend and a pattern blend, the color or pattern blend being based on colors or patterns associated with tasks of the given process.

20 Claims, 19 Drawing Sheets

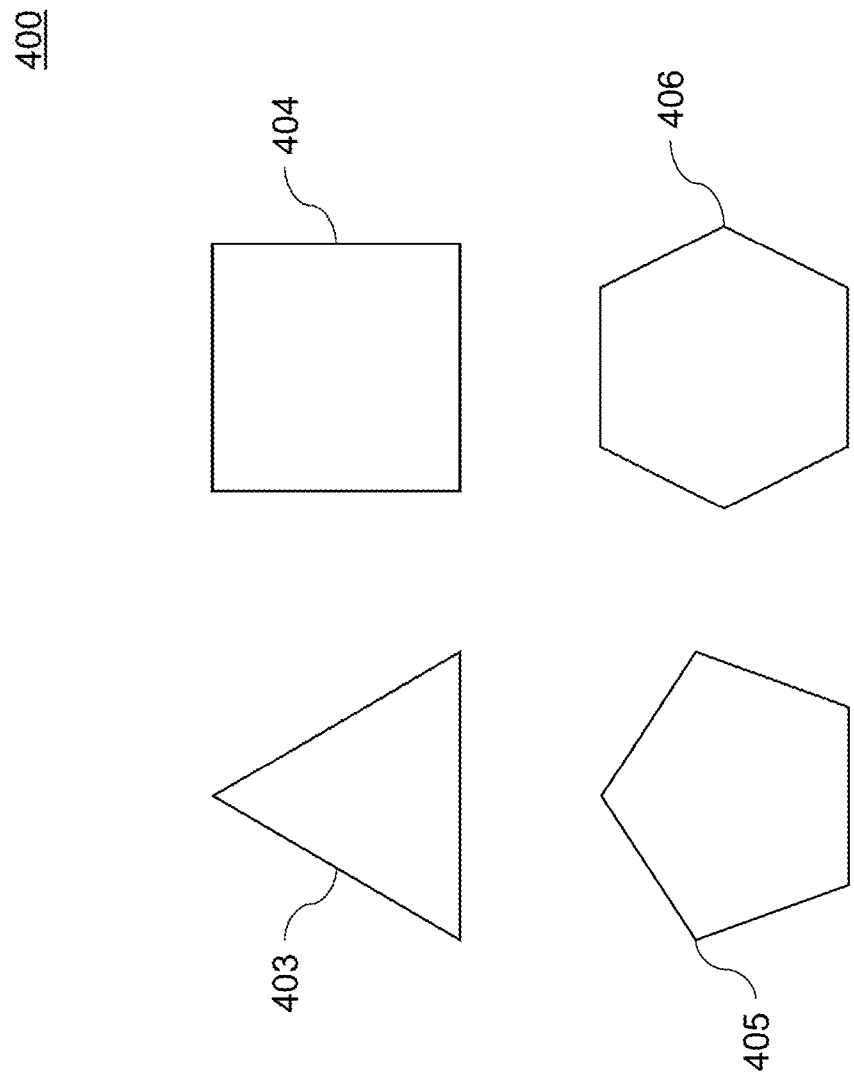

```html
<html>
<head>
<link rel="stylesheet" type="text/css" href="clear.css"/>
</head>
<body>
<div id="container">
<input class="btn btn-primary" id="shipping1" onclick="draw(180, 0, 0, 0);" value="Shipping 1" type="button" />
<input class="btn btn-primary" id="shipping2" onclick="draw(80, 0, 0, 0);" value="Shipping 2" type="button" />

<input class="btn btn-primary" id="payment1" onclick="draw(0, 0, 190, 1);" value="Payment 1" type="button" />
<input class="btn btn-primary" id="payment2" onclick="draw(0, 0, 90, 1);" value="Payment 2" type="button" />

<input class="btn btn-primary" id="billing1" onclick="draw(0, 200, 0, 2);" value="Billing 1" type="button" />
<input class="btn btn-primary" id="billing2" onclick="draw(0, 100, 0, 2);" value="Billing 2" type="button" />

<input class="btn btn-primary" id="clear" onclick="clearShape();" value="Clear" type="button" />
<canvas id="canvas" width="300" height="300"></canvas>
</div>
<script src="script.js"></script>
</body>
</html>
```

```
#container {
  height: 400px;
  position: relative;
  width: 400px;
}
#canvas {
  height: 100%;
  width: 100%;
}
#shipping2 {
  bottom: 50;
  left: 0;
  position: absolute;
  width: 30%;
  background-color: rgb(100, 0, 0);
}
#shipping1 {
  bottom: 90;
  left: 0;
  position: absolute;
  width: 30%;
  background-color: rgb(200, 0, 0);
}
#payment2 {
  bottom: 50;
  left: 275;
  position: absolute;
  width: 30%;
  background-color: rgb(0, 0, 100);
}
```

600-2

```
#payment1 {
  bottom: 90;
  left: 275;
  position: absolute;
  width: 30%;
  background-color: rgb(0, 0, 200);
}
#billing2 {
  bottom: 310;
  left: 150;
  position: absolute;
  width: 30%;
  background-color: rgb(0, 100, 0);
}
#billing3 {
  bottom: 350;
  left: 150;
  position: absolute;
  width: 30%;
  background-color: rgb(0, 200, 0);
}
#clear {
  bottom: -50;
  left: 150;
  position: absolute;
  width: 30%;
}
```

```
var colorsOfSides = [
  { r: 0, g: 0, b: 0 },
  { r: 0, g: 0, b: 0 },
  { r: 0, g: 0, b: 0 }];

function translateColor(r, g, b) {
  return "rgb(" + r + ", " + g + ", " + b + ")";
} function clearShape(){
  for (var i = 0; i < colorsOfSides.length; i++) {
    colorsOfSides[i].r = 0;
    colorsOfSides[i].g = 0;
    colorsOfSides[i].b = 0;
  }
  console.log("qwe");
  draw(0, 0, 0, -1);
}
```

700-2

```
function draw(r, g, b, side) {
  var canvas = document.getElementById("canvas");
  var elements = [];

if (canvas.getContext) {
    var ctx = canvas.getContext("2d");
    var radius = 150.0;
    var numberOfVertices = 3.0;
    var angle = 360.0 / numberOfVertices * (Math.PI / 180.0);
    var currentAngle = 0.0;

ctx.beginPath();
    ctx.moveTo(0.0, 0.0);
    ctx.lineTo(radius * 2.0, 0.0);
    ctx.lineTo(radius * 2.0, radius * 2.0);
    ctx.lineTo(0.0, radius * 2.0);
    ctx.lineTo(0.0, 0.0);
    ctx.moveTo(radius, 2.0 * radius);

if (side >= 0) {
      colorsOfSides[side] = {
        r: r,
        g: g,
        b: b
      };
    }
```

700-3

```
    console.log(colorsOfSides[0]);
    console.log(colorsOfSides[1]);
    console.log(colorsOfSides[2]);

var mix = mixColors();
    ctx.fillStyle = translateColor(mix.r, mix.g, mix.b);
    ctx.fill();

for (i = 0; i <= numberOfVertices; i++) {
      var quarter = determineQuarter(currentAngle);
      var acute = reduceToAcute(currentAngle);
      var coordinates = calculateCoordinates(quarter, acute, radius);
      var x = coordinates[0];
      var y = coordinates[1];
      currentAngle += angle;

ctx.lineTo(x, y);
    } ctx.stroke();

ctx.fillStyle = "white";
    ctx.fill();
  }
}
```

```
function determineQuarter(angle) {
    var result = "";

if (angle >= 0 && angle < 90) {
        result = 1;
    } else if (angle >= 90 && angle < 180) {
        result = 2;
    } else if (angle >= 180 && angle < 270) {
        result = 3;
    } else {
        result = 4;
    } return result;
} function reduceToAcute(angle) {
    while (angle >= 90) {
        angle -= 90;
    }
    return angle;
}
```

700-5

```
function mixColors() {
    var totalRed = 0;
    var totalGreen = 0;
    var totalBlue = 0;

for (var i = 0; i < colorsOfSides.length; i++) {
        totalRed += colorsOfSides[i].r;
        totalGreen += colorsOfSides[i].g;
        totalBlue += colorsOfSides[i].b;
    } return {
        r: totalRed > 255 ? 255 : totalRed,
        g: totalGreen > 255 ? 255 : totalGreen,
        b: totalBlue > 255 ? 255 : totalBlue,
    }
} function translate(x) {
    return x + 150;
}
```

700-6

```
function calculateCoordinates(quarter, angle, radius) {
    var x = 0;
    var y = 0;

if (quarter == 1) {
        x = radius * Math.sin(angle);
        y = radius * Math.cos(angle);
    } else if (quarter == 2) {
        x = radius * Math.cos(angle);
        y = -1.0 * radius * Math.sin(angle);
    } else if (quarter == 3) {
        x = -1.0 * radius * Math.cos(angle);
        y = -1.0 * radius * Math.sin(angle);
    } return [translate(x), translate(y)];

draw(0, 0, 0, -1);
}
```

FIG. 7B

GENERATING VISUAL INDICATORS REPRESENTING COMPLEXITY OF PROCESSES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to generation of visual indicators.

BACKGROUND

In information processing systems, there may be various processes that a user selects between. A user, for example, may be presented with multiple candidate processes, and be prompted to select between the different candidate processes. Each candidate process may have an associated complexity, which is difficult for the user to determine upfront. As such, users often have no or insufficient capability for comparing the complexity of the candidate processes, making selection amongst the different candidate processes difficult, confusing and inefficient.

SUMMARY

Illustrative embodiments of the present invention provide techniques for generation and display of visual indicators representing complexity of processes. Such techniques in some embodiments advantageously permit informed selection amongst different candidate processes by a user, as well as providing mechanisms for simplifying execution of a selected process through interaction with user interface features of a displayed visual indicator.

In one embodiment, a method comprises identifying one or more processes presented on a display of a given client device, determining a complexity of at least a given one of the one or more processes, wherein determining the complexity of the given process comprises determining a number of tasks of the given process, generating a given visual indicator of the complexity of the given process, the given visual indicator comprising a shape with a number of features based on the number of tasks of the given process, and providing the given visual indicator for presentation on the display of the given client device in association with the given process. The method is performed by at least one processing device comprising a processor coupled to a memory.

The processing device may be the same as the given client device, or may be implemented on a server hosting the given process for the given client device, or another device or as a service provided to the given client device.

These and other illustrative embodiments include, without limitation, methods, apparatus, networks, systems and processor-readable storage media.

BRIEF DESCRIPTION OF THE DRAWINGS

FIG. 4 illustrates shapes which may be used for generation of visual indicators in an illustrative embodiment.

FIG. 5 shows pseudocode for generating a visual indicator in an illustrative embodiment.

FIG. 6 shows pseudocode for a stylesheet used in generating a visual indicator in an illustrative embodiment.

FIGS. 7A and 7B show pseudocode for a script used in generating a visual indicator in an illustrative embodiment.

DETAILED DESCRIPTION

Figure 1:
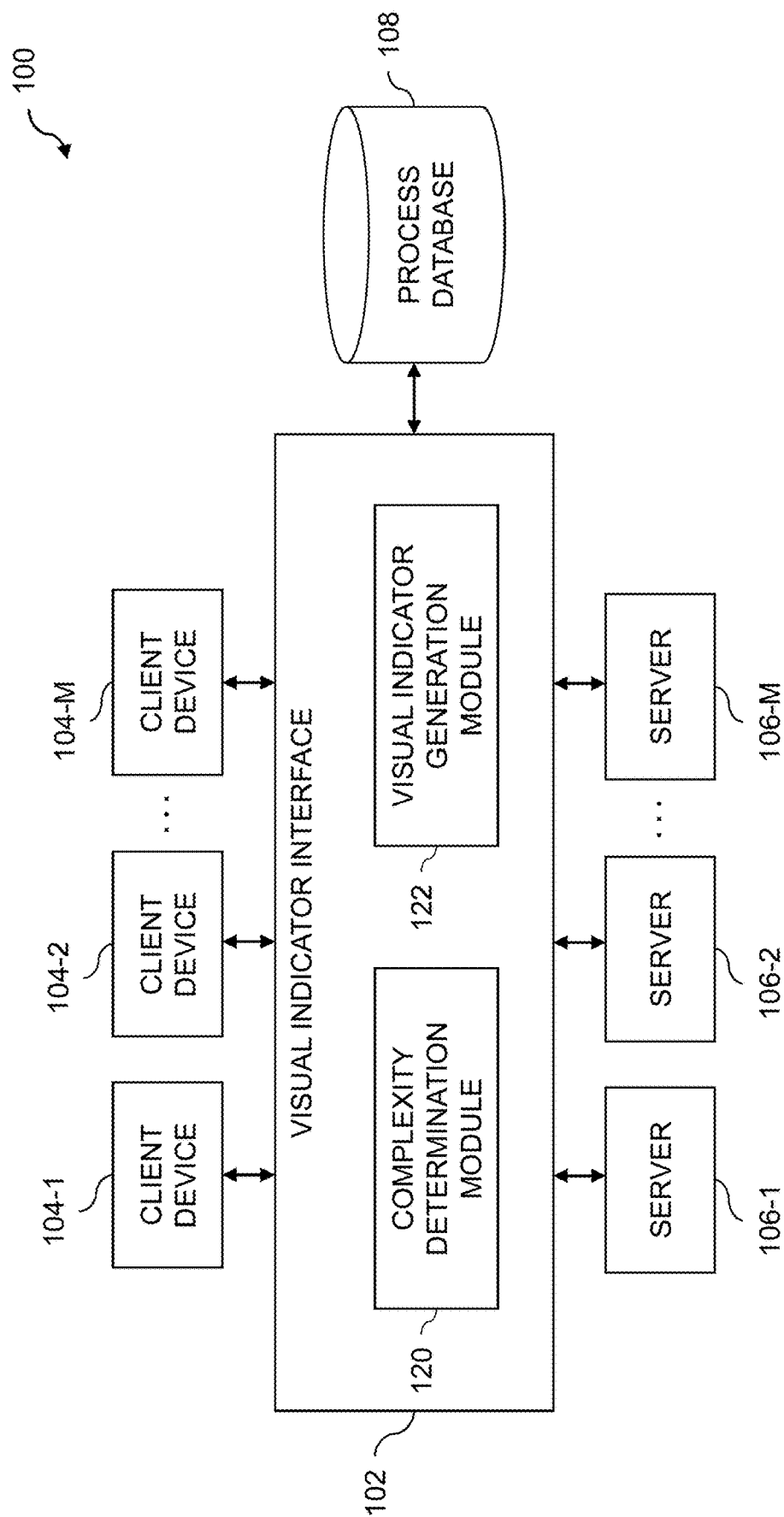
FIG. 1 is a block diagram of an information processing system for generation of visual indicators in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As discussed above, processes in information processing systems may have varying complexity. It is difficult, however, for a user to ascertain the complexity of a process upfront, such as before selecting or starting tasks of the process. One exemplary use case of processes which may vary in complexity is completing a purchase order or other e-commerce transaction. In some cases, a purchase order on an e-commerce website may ask a user for selection of a payment method, billing and/or shipping addresses, and method of delivery. In other cases, the purchase order may require various other tasks or sub-processes, such as entry of account information, tax-exempt information, eligibility for promotions or other information, product or service registration, etc.

Another use case of processes which may vary in complexity is account registration. Some account registration procedures may require entry or selection of a user identifier (e.g., an e-mail address) and password only, while other account registration procedures may require entry of various additional or alternative information (e.g., address, gender, age, payment information, social security number, etc.).

A further use case of processes which may vary in complexity is in running an application (or a function or feature thereof) on a computing device. Consider, as an example, an antivirus software. In some cases, the antivirus software may require only minimal input to run (e.g., selection of a "start" button or other user interface feature to initiate a scan). In other cases, the antivirus software may require more detailed input (e.g., selection of a particular system, disk, folder or file to scan, selection of types of scanning to be performed, selection of default remedial actions, etc.). It is to be appreciated that the above-noted use cases are presented by way of example only, and that various other types of processes may vary in complexity with the complexity not being readily apparent upfront.

In addition to difficulties in determining complexity of a process upfront, it can also be difficult to locate problems or abnormalities in complex configurations or processes. Also, when various complex configurations or candidate processes are available, it can be difficult to compare them. Thus, a need exists for techniques which identify complexity of configurations or other processes to provide informed selection therebetween. Embodiments provide techniques for representing complex processes as a combination of shape and color and/or pattern, allowing users to identify complexity of processes upfront.

FIG. 1 shows an information processing system 100 configured in accordance with an illustrative embodiment of the invention. The information processing system 100 comprises a visual indicator interface 102 coupled between a plurality of client devices 104-1, 104-2, . . . 104-M (collectively, client devices 104) and a plurality of servers 106-1, 106-2, 106-M (collectively, servers 106). Although not shown, the visual indicator interface 102 may be coupled to the client devices 104 and servers 106 via one or more networks. Also shown is a process database 108 coupled to the visual indicator interface 102. The process database 108 stores information relating to configurations or other processes as will be described in further detail below.

The client devices 104 may comprise, for example, mobile telephones, laptop computers, tablet computers, desktop computers or other types of devices, in any combination. Such devices are examples of what are more generally referred to herein as "processing devices." Some of these processing devices are also generally referred to herein as "computers."

In some embodiments, the client devices 104 are devices utilized by members of an enterprise. For example, the client devices 104 may comprise respective computers associated with a particular company, organization or other enterprise. The visual indicator interface 102 may be provided as a service to that enterprise, for use by members thereof via the client devices 104.

As mentioned above, the visual indicator interface 102, client devices 104, servers 106 and process database 108 may be coupled or otherwise connected via one or more networks. The one or more networks, in some embodiments, are assumed to comprise a global computer network such as the Internet, although other types of networks may be used, including a wide area network (WAN), a local area network (LAN), a satellite network, a telephone or cable network, a cellular network, a wireless network such as a WiFi or WiMAX network, or various portions or combinations of these and other types of networks. The network connecting the visual indicator interface 102, client devices 104, servers 106 and process database 108 in some embodiments therefore comprises combinations of multiple different types of networks each comprising processing devices configured to communicate using Internet Protocol (IP) or other related communication protocols.

The servers 106 may be web servers, application servers, etc. or other types of servers which provide processes used by the client devices 104. For example, the servers 106 may be web servers which provide e-commerce services for the client devices 104, application servers which provide web-based or other types of applications, services or other functionality for the client devices 104, etc. In some embodiments, the servers 106 are part of a cloud computing network providing services to users of the client devices. The services, applications, functionality or more generally processes provided or otherwise made available to client devices 104 by servers 106 vary in complexity as described above.

The visual indicator interface 102 comprises a complexity determination module 120 and a visual indicator generation module 122. The complexity determination module 120 is configured to determine complexity of processes (e.g., services, applications, functionality, etc. provided by servers 106), possibly using information stored in process database 108. The visual indicator generation module 122 is configured to generate visual indicators of the complexity of processes for presentation on displays of the client devices 104. The visual indicators may be N-sided polygon shapes with color and/or pattern blends, where the number of sides N and color/pattern blend are based at least in part on the complexities of the processes.

In some embodiments, a given one of the client devices 104-1 may be selecting from amongst different candidate processes offered by one or more of the servers 106. A display of the client devices 104-1 may include a listing or other presentation indicating the different candidate processes offered by the servers 106. The visual indicator interface 102, by querying the servers 106 and/or utilizing information stored in the process database 108, generates visual indicators (possibly along with user interface features) for presentation on a display of the client device 104-1 in association with the different candidate processes. The visual indicators identify levels of complexity of the different candidate processes (e.g., using shape and color/pattern), thus allowing the user of the client device 104-1 to determine the complexity of the candidate processes upfront for informed selection therebetween.

In other embodiments, visual indicators generated by the visual indicator generation module 122 of visual indicator interface 102 may be presented on a display of the client device 104-1 as the client device 104-1 is completing a given process. The visual indicator may update or change in response to the client device 104-1 completing tasks or sub-processes of the given process (e.g., by adjusting the color or pattern of the visual indicator, a shape of the visual indicator, etc.).

The visual indicator may also provide user-selectable options for completing tasks or sub-processes of the given process. As one example, one step of the given process may be entering address information, with the visual indicator generated by visual indicator generation module 122 having a side or portion thereof labeled "address information" with user-selectable options or interface features for selecting between different addresses (e.g., a residence address, a billing address, a mailing address, etc.). As a user of client device 104-1 selects the options, features of the visual indicator may change to reflect such selection (e.g., changing a color or pattern of at least a portion of the visual indicator to reflect selection of a particular one of different addresses). The different addresses or other information used to populate the user-selectable options of the visual indicator may be based on information obtained by the visual indicator interface 102 from the process database 108. In some embodiments, the visual indicator with user-selectable options or interface features is presented alongside existing entry fields or other interface features on the display of the client device 104-1. In other embodiments, the visual indicator with user-selectable options or interface features replaces existing entry fields or other interface features on the display of the client device 104-1.

Although the visual indicator interface 102 is shown as external to the client devices 104 and servers 106 in FIG. 1, this is not a requirement. In some embodiments, the visual indicator interface 102 is implemented as a script (e.g., in a web browser or other application on the client devices 104 or on servers 106), an application programming interface (API) on one or both of the client devices 104 and servers 106, etc. Further, in some embodiments the visual indicator interface 102 may be implemented internally to one of the client devices 104, and may run for determining complexity of local processes running on that client device (in addition to or in place of running to determine complexity of services, applications, features or other processes offered by servers 106). The process database 108 may similarly be implemented internal to one or more of the client devices 104, visual indicator interface 102 and servers 106.

The process database 108, as mentioned above, may store information relating to various processes (e.g., number and type of sub-processes, tasks or other steps in a process, input or other action required to complete designated types of sub-processes, tasks or other steps, etc.). The process database 108 may also store information for one or more of the client devices 104 (or for particular users thereof) for completing designated types of sub-processes, tasks or other steps. For example, as mentioned above the process database 108 may store different types of address information for a user.

The process database 108 in some embodiments is implemented using one or more storage devices associated with the system 100. Such storage devices may comprise, for example, storage products such as VNX® and Symmetrix VMAX®, both commercially available from Dell EMC Corporation of Hopkinton, Mass. A variety of other storage products may be utilized to implement at least a portion of the storage devices in the system 100.

Although not explicitly shown in FIG. 1, one or more input-output devices such as keyboards, displays or other types of input-output devices may be used to support one or more user interfaces to the visual indicator interface 102, client devices 104 and servers 106, as well as to support communication between such elements and other related systems and devices not explicitly shown.

In the present embodiment, visual indicators or other notifications, alerts, etc. that are generated by the visual indicator interface 102 are provided over one or more networks to the client devices 104 for presentation on displays thereof. The visual indicators may be provided using one or more APIs, scripts or other functions or features of client devices 104.

Additional details regarding the visual indicator interface 102 will be described in further detail below with respect to FIGS. 3-18.

It is to be appreciated that the particular arrangement of the visual indicator interface 102, client devices 104, servers 106 and process database 108 in the FIG. 1 embodiment is presented by way of example only, and alternative arrangements can be used in other embodiments. As discussed above, for example, the visual indicator interface 102 or portions thereof (e.g., complexity determination module 120 and visual indicator generation module 122), the process database 108, etc. may in some embodiments be implemented at least partially internal to one or more of the client devices 104 or servers 106. As another example, functionality associated with the complexity determination module 120 and visual indicator generation module 122 may be combined into one module, or separated across more than two modules with the multiple modules possibly being implemented with multiple distinct processors.

At least portions of the complexity determination module 120 and visual indicator generation module 122 may be implemented at least in part in the form of software that is stored in memory and executed by a processor.

It is to be understood that the particular set of elements shown in FIG. 1 for generation of visual indicators is presented by way of illustrative example only, and in other embodiments additional or alternative elements may be used. Thus, another embodiment may include additional or alternative systems, devices and other network entities, as well as different arrangements of modules and other components.

The visual indicator interface 102, servers 106 and/or process database 108 may be implemented at least in part using one or more processing platforms including public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in some embodiments is VMware® vSphere® which may have an associated virtual infrastructure management system such as the VMware® vCenter™.

Other processing platforms may be used to implement the visual indicator interface 102, servers 106 and/or process database 108 in other embodiments, such as different types of virtualization infrastructure in place of or in addition to virtualization infrastructure comprising virtual machines. Such virtualization infrastructure illustratively includes container-based virtualization infrastructure configured to provide Docker containers or other types of Linux containers (LXCs).

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Figure 2:
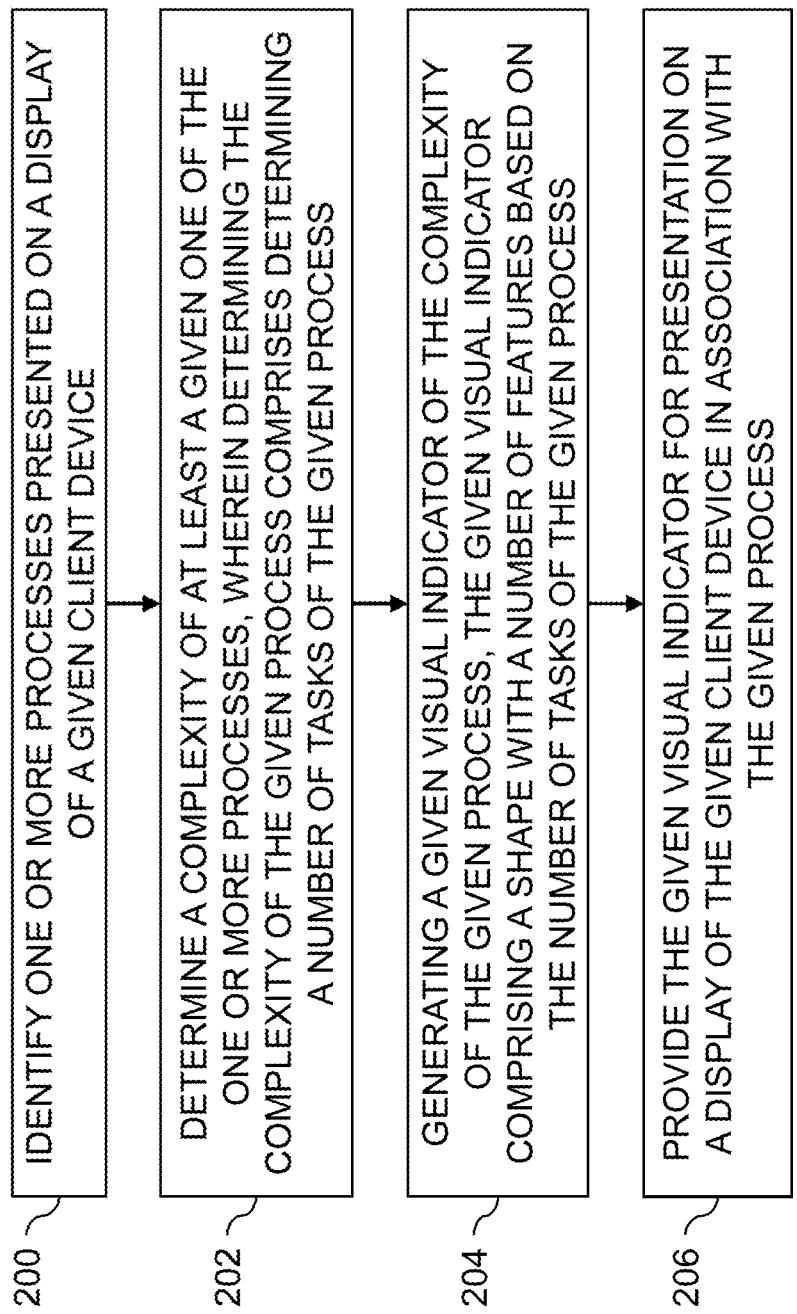
FIG. 2 is a flow diagram of an exemplary process for generation of visual indicators in an illustrative embodiment.

An exemplary process for generation of visual indicators will now be described in more detail with reference to the flow diagram of FIG. 2. It is to be understood that this particular process is only an example, and that additional or alternative processes for generation of visual indicators can be carried out in other embodiments.

In this embodiment, the process includes steps 200 through 212. These steps are assumed to be performed by a processor of the visual indicator interface 102 utilizing complexity determination module 120 and visual indicator generation module 122. The process begins with step 200, identifying one or more processes presented on a display of a given client device. Step 200 may involve, for example, identifying different purchase orders, different applications to run, etc.

In step 202, a complexity of at least a given one of the processes identified in step 200 is determined. Step 202 may involve determining a number of tasks of the given process. In step 204, a visual indicator of the complexity of the given process is generated. The given visual indicator may have a shape with a number of features that are based on the number of tasks of the given process. For example, the given visual indicator may comprise a polygon having a number of sides based on the number of tasks of the given process (e.g., an N-task process would be represented as an N-sided polygon). As another example, the given visual indicator may comprise a star with a number of points based on the number of tasks of the given process (e.g., an N-task process would be represented as an N-pointed star). As s further example, the given visual indicator may comprise a hub with spokes, with the number of spokes being based on the number of tasks of the given process (e.g., an N-task process would be represented as an N-spoke hub). Various other types of shapes and shape features may be used in other embodiments, including but not limited to a flower shape with different numbers of petals, etc. In the description below, it is assumed that the visual indicator is an N-sided polygon, but various other shapes and corresponding features may be used as desired. The given visual indicator is provided for presentation on the display of the given client device in step 206.

In some embodiments, each side of the given visual indicator is associated with one of the tasks of the given process. Each side of the given visual indicator may have a color or pattern that is based at least in part on an associated task of the given process. The given visual indicator may have a color/pattern blend of the colors/patterns of each side of the given visual indicator. Step 206 may further include dynamically updating the color/pattern of a given side of the given visual indicator responsive to a change in a given task of the given process associated with the given side. The change in the task of the given process may comprise one or more of selection between two or more options for the given task of the given process, completing the given task of the given process, etc. Step 206 may further include dynamically updating the color/pattern blend of the given visual indicator responsive to changes in tasks of the given process. Dynamically updating the color/pattern blend may comprise changing a color or pattern of the given visual indicator to a predefined color or pattern recognizable to a user of the given client device in response to one or more designated types of changes in the tasks of the given process. The predefined color or pattern may represent an error or unexpected result, where the given visual indicator is dynamically updated to the predefined color in response to changes in the tasks of the given process that represent errors or unexpected results.

Step 206 in some embodiments includes providing the given visual indicator for display along with or alongside the given process or one or more tasks thereof. The given visual indicator may further comprise one or more user interface features associated with one or more sides of the given visual indicator, each of the user interface features comprising a user-selectable option for completing an associated task of the given process. Such a visual indicator may be presented alongside the given process or one or more tasks thereof, or as a replacement for display of the tasks.

Figure 3:
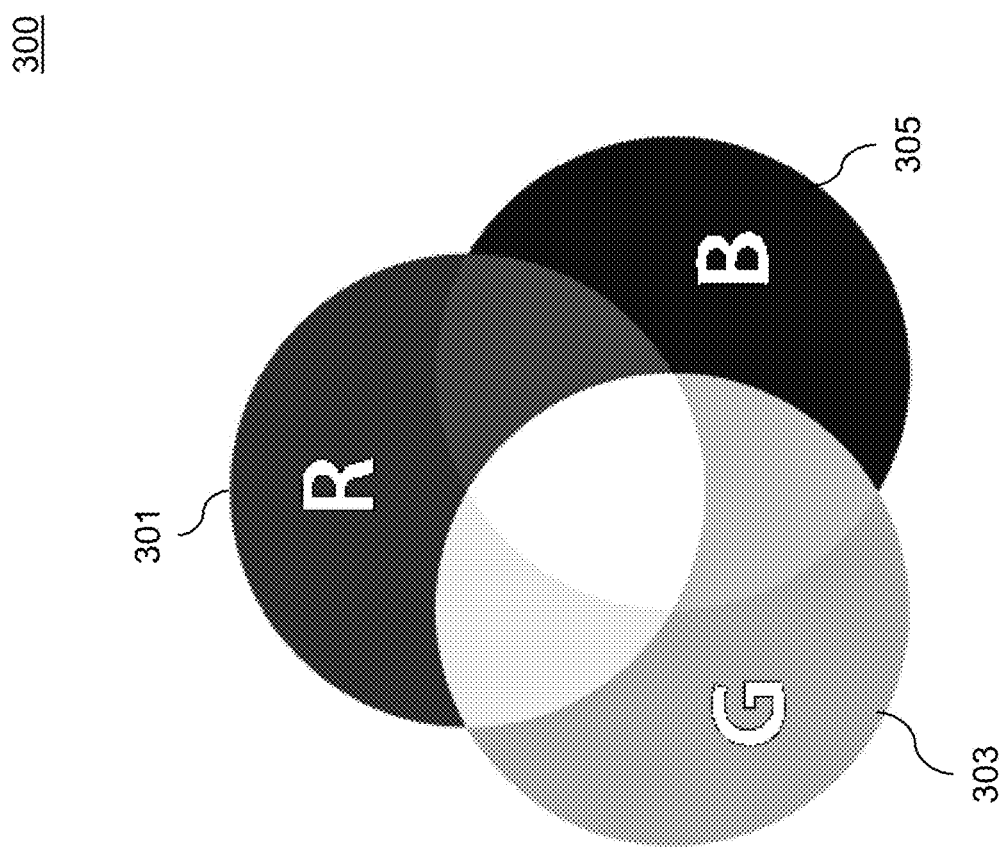
FIG. 3 is a diagram of a color scheme utilizable for generation of visual indicators in an illustrative embodiment.

FIG. 3 shows a color scheme 300 that may be used for generating color blended visual indicators. The color scheme 300 is a red-green-blue (RGB) color model, with red 301, green 303 and blue 305 being blended together to reproduce a broad variety of colors. In some embodiments, different colors are associated with different sub-processes, tasks or steps in a process, or for different user-selectable options for steps in a process. The color blend of a visual indicator may in some cases be used to represent one or more properties of the process (e.g., different colors may indicate an expected length of time required to complete a process, a remaining time left to complete a process, etc.). Various options will be described in further detail below.

While various embodiments are described herein with respect to the use of color blends in the visual indicators, embodiments are not so limited. In other embodiments, different sides or features of a visual indicator may be associated with different patterns (e.g., hatching, shading, etc.) in addition to or in place or being associated with different colors, with the visual indicator being a blend of the different patterns associated with each side or feature thereof. Such an arrangement may be useful for visually impaired clients or users (e.g., colorblind users).

FIG. 4 depicts a number of shapes 400 which may be used for visual indicators. In some embodiments, the visual indicator comprises an N-sided shape (e.g., an N-sided polygon) where the number of polygon sides N represents a number of steps in a process. Thus, the triangle shape 403 would be used to represent a three-step process, the square or rectangular shape 404 would be used to represent a four-step process, the pentagon shape 405 would be used to represent a five-step process, and the hexagon shape 406 would be used to represent a six-step process. Alternately, the number of sides of the shape in a visual indicator may be used to represent an expected time required to complete a process (e.g., each side may represent one minute, five minutes, fifteen minutes, one hour, etc.) rather than the number of steps in the process. As mentioned above, however, embodiments are not limited to the use of N-sided polygons for visual indicators. In other embodiments, other types of shapes with different numbers of features (e.g., stars with different numbers of points, hubs with different numbers of spokes, flowers with different numbers of petals, etc.) may be used in addition to or in place of polygons with different numbers of sides.

The visual indicator interface 102 in some embodiments is implemented as an API. The API may be used to provide users of client devices 104 with a hypertext markup language (HTML)-injectable, interactive visualization for modeling processes. The API may use one or more functions for shape creation of a visual indicator. In some embodiments, the shape creation function is f(numberOfStepsInTheProcess), which creates a visual indicator with a shape having numberOfStepsInTheProcess sides and where each side is assigned a default distinguishable color or pattern. In other embodiments, the shape creation function is f(numberOfStepsInTheProcess, colors/patterns), which creates a visual indicator with a shape having numberOfStepsInTheProcess sides and where each side is assigned a color and/or pattern defined by the "colors/patterns" input. In still other embodiments, the shape creation function is f(numberOfStepsInTheProcess, stepsNames, optionsNames, colors/patterns), which creates a shape having numberOfStepsInTheProcess sides and where each side: is labeled based on the input stepsNames; provides user-selectable options based on the input optionsNames; and is assigned a color and/or pattern defined by the "colors/patterns" input.

The visual indicator interface API may also provide functions for generating interactive visual indicators. Such functions may include f(option) which selects an option from the user-selectable options based on the input optionsNames. The selected option belongs to one side of the visual indicator shape, and selecting the option may change the color and/or pattern of that side which changes the balance of colors and/or patterns participating in the blend or mix of colors and/or patterns for the visual indicator. A function f( ) may be used to reset the visual indicator shape to an initial state (e.g., clears selections from previous invocations of f(option)).

By using the additive RGB color model scheme 300, selection of the options may be used to change the color of the visual indicator to one that is recognizable for the user for quick verification. For example, consider a use case of an e-commerce payment process. The user may have different options for billing, shipping and address information based on whether that user is making a personal or business purchase (e.g., a first payment method, delivery method and delivery address for personal and a second payment method, delivery method and delivery address for business). The visual indicator may have: (i) a first color known to the user if the personal payment method, personal delivery method and personal address options are selected; (ii) a second color known to the user if the business payment method, business delivery method and business address options are selected; and (iii) one or more other colors if combinations of business and personal options are selected. In case (i) or (ii), the user will readily recognize the known color and see that the process is being completed accurately, while if one of the other colors is shown this may indicate an error. Of course, it is possible for the user to have additional known color options for other variations of option selections. As an example, the user may use a business address for personal purchases whose delivery requires a signature as that user may be at the business address during the expected delivery time. This combination of options may be represented by setting the visual indicator to a third color known to the user. Similarly, different configurations may be identified using user-recognizable patterns or pattern blends in addition to or in place of user-recognizable colors or color blends.

Figure 8:
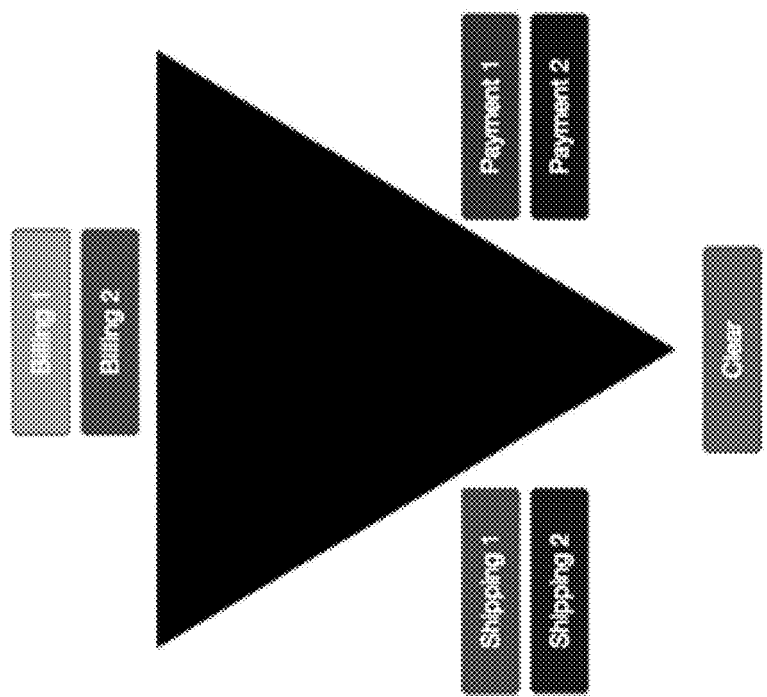
FIG. 8 shows a visual indicator generated utilizing the pseudocode of FIGS. 5-7 in an illustrative embodiment.

FIG. 5 shows pseudocode 500 for generating button options for a visual indicator with two shipping options, two payment options and two billing options, along with a button for clearing previous selections (of the shipping, payment and billing options). Although not shown in the pseudocode, the header may include links to other Cascading Style Sheet (CSS) stylesheets, such as to the Bootstrap CSS library. Also, other scripts in addition to "script.js" may be referenced or included, such as scripts for the jQuery Javascript library, the Bootstrap Javascript library, etc. FIG. 6 shows pseudocode 600-1 and 600-2 (collectively, pseudocode 600) for the "clear.css" stylesheet referenced in the pseudocode 500. FIGS. 7A and 7B show pseudocode 700-1, 700-2, 700-3, 700-4, 700-5 and 700-6 (collectively, pseudocode 700) for the "script.js" referenced in pseudocode 500. The API provided by pseudocode 500, 600 and 700 provides the output 800 shown in FIG. 8. The output 800 dynamically updates a color blend of the visual indicator (e.g., the triangle) based on the options selected for shipping, billing and payment, with the clear button resetting to a default color (black as shown in FIG. 8).

Figure 9:
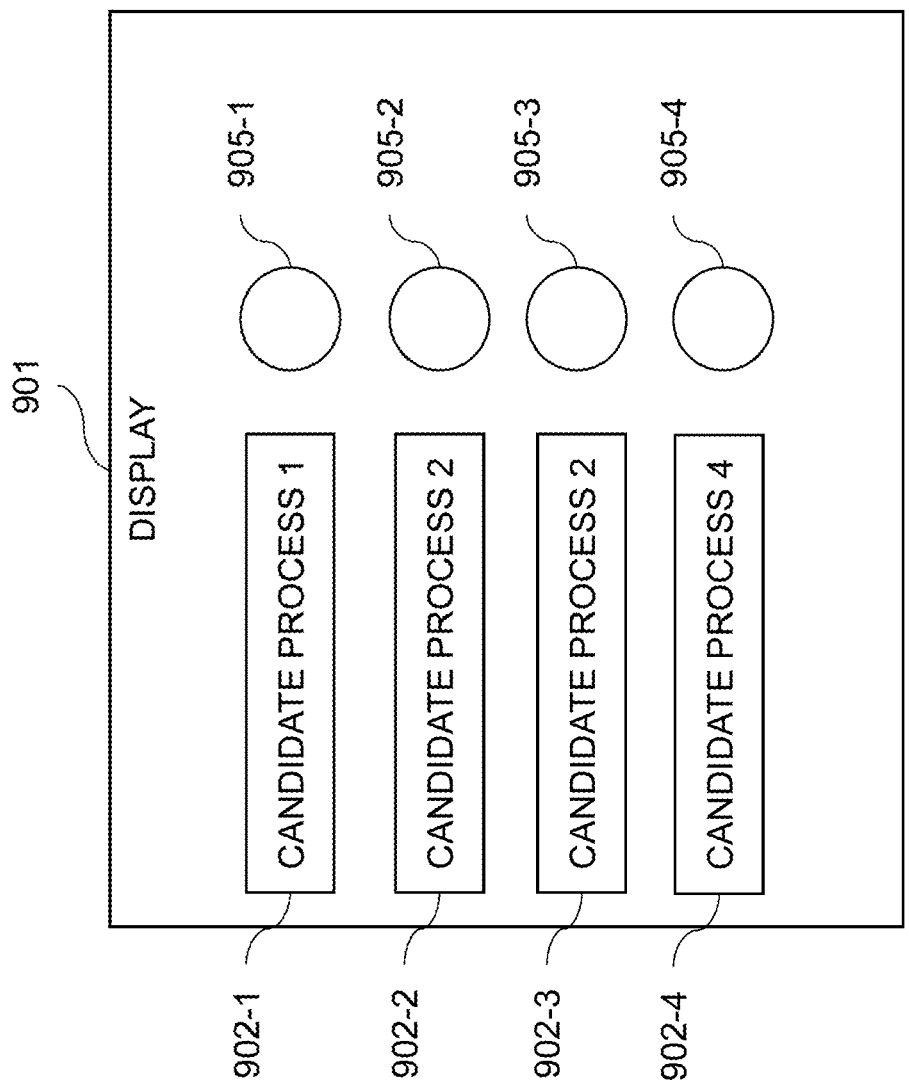
FIG. 9 shows a view of a display with visual indicators representing complexities of a number of candidate processes in an illustrative embodiment.

FIG. 9 shows a view 900 of a display 901 of a client device (e.g., one of the client devices 104) utilizing the visual indicator interface 102. The display 901 presents a number of candidate process 902-1, 902-2, 902-3 and 902-4 (collectively, candidate processes 902) along with associated visual indicators 905-1, 905-2, 905-3 and 905-4 (collectively, visual indicators 905). Each of the visual indicators 905 may comprise an N-featured shape visual indicator with a color and/or pattern blend based on the options provided or selected for each side of the visual indicator, where each side corresponds to a step or sub-process within a corresponding one of the candidate processes. Where the N-featured shape visual indicator is an N-sided polygon, a candidate process with three steps is represented as a triangle, a candidate process with four steps is represented as a square, a candidate process with five steps is represented as a pentagon, etc. Candidate processes with fewer than three steps may be represented by a line, a special designated shape, etc. Candidate processes with greater than a designated number of steps may be represented as some special designated shape as well.

The visual indicators 905 have color or pattern blends based on features of their associated candidate processes 902. For example, each side of the visual indicator may be a color and/or pattern which denotes the type of activity or action required for a particular step in a candidate process (e.g., green for billing, blue for shipping, yellow for address, etc.). Alternatively or additionally, the color and/or pattern of a side of a visual indicator may represent the input selected for that step in the candidate process (e.g., green for a first payment method, red for a second payment method, etc.). In some embodiments, the color and/or pattern of the visual indicators 905 are blends of the colors and patterns for each side. Common processes may thus be readily recognized by users. For example, an e-commerce transaction that requires entry of billing, address and shipping information may have an associated visual indicator with a blend of the colors representing such tasks, with the blended color being readily recognizable by the user. The color blend of the visual indicators 905 may thus provide a user of the client device with upfront understanding of the candidate processes 902, or of the selected options for a candidate process.

Figure 10:
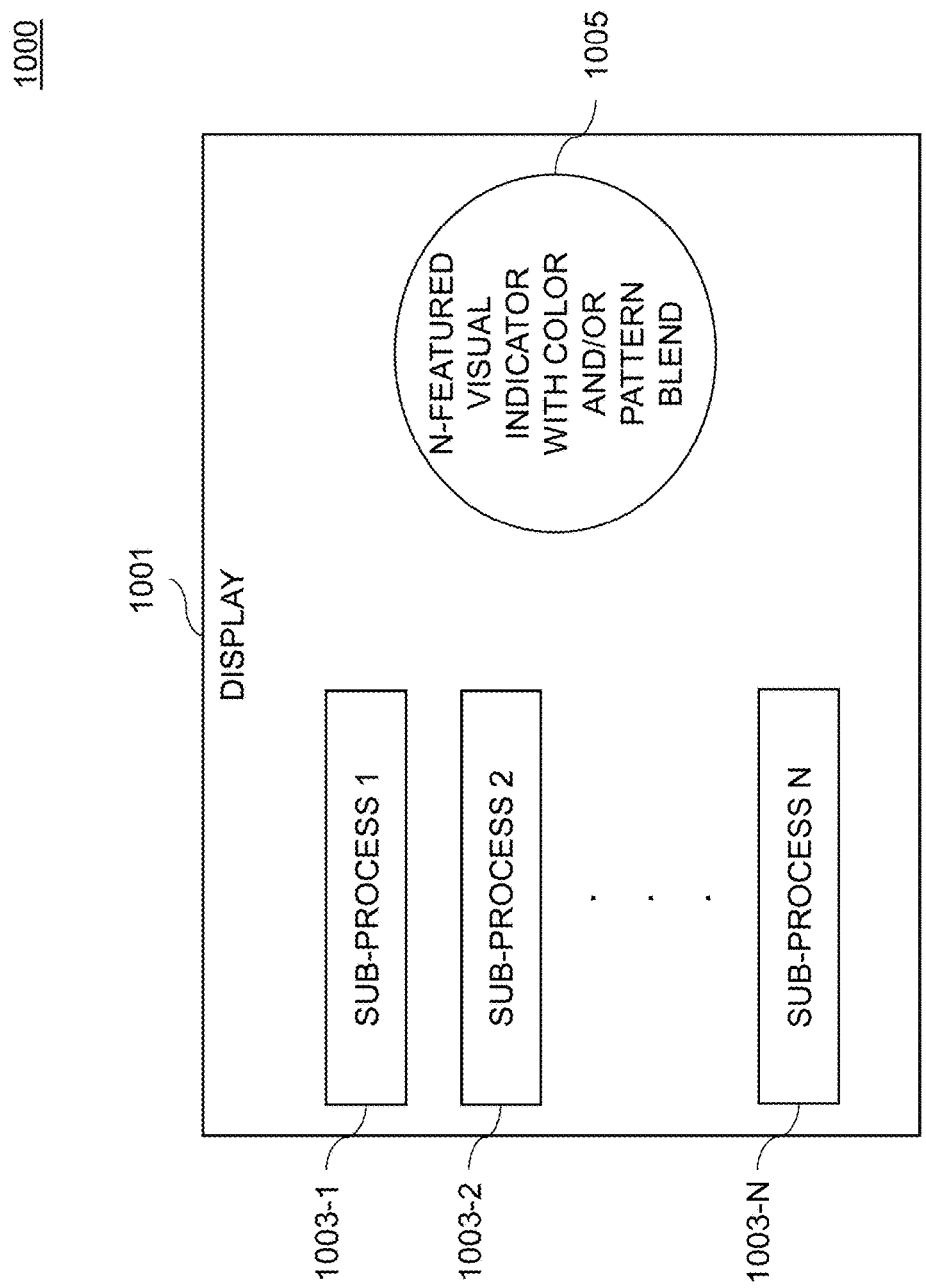
FIG. 10 shows a view of a display with a visual indicator presented along with sub-processes of a selected process in an illustrative embodiment.
Figure 11:
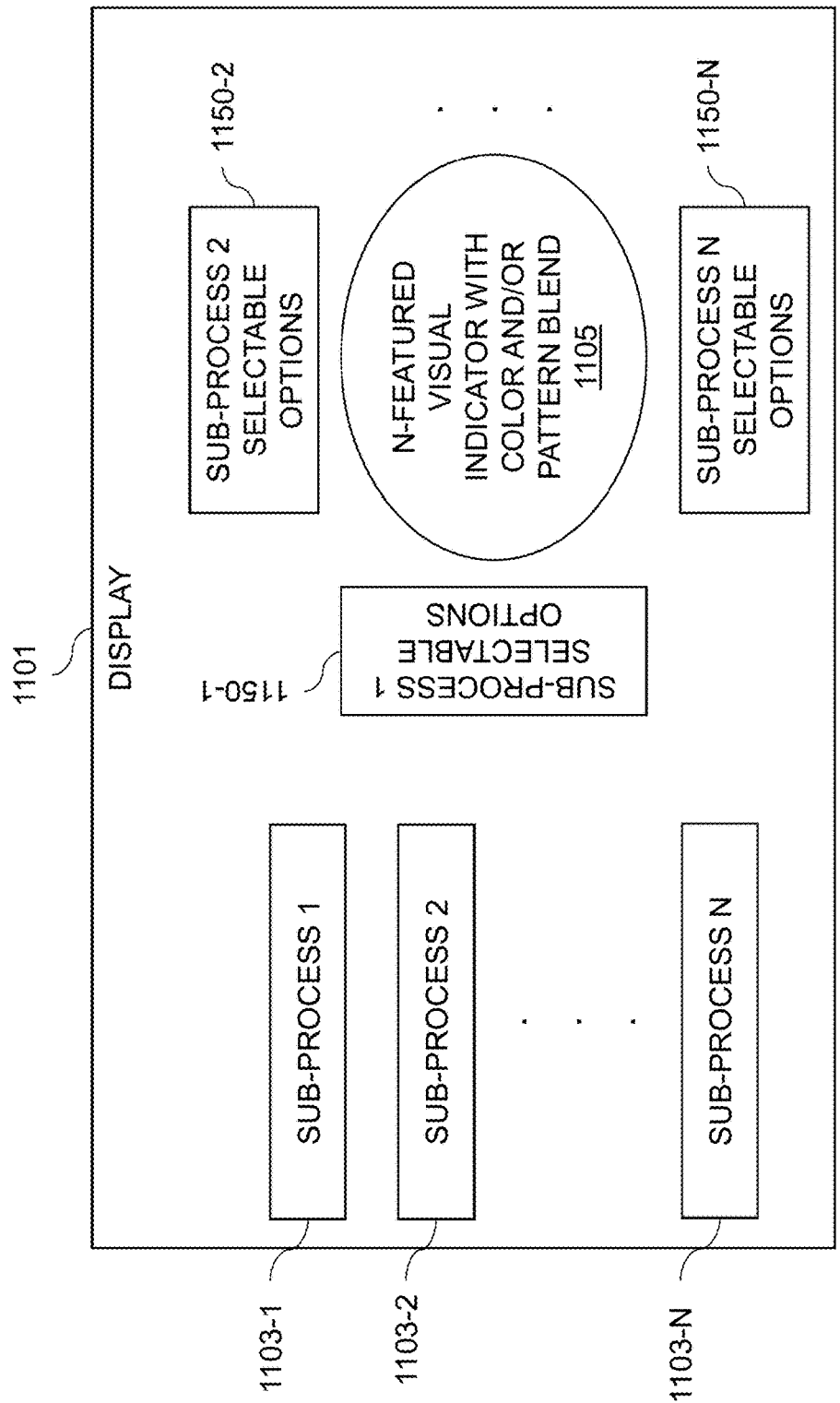
FIG. 11 shows a view of a display with a visual indicator having selectable options presented along with sub-processes of a selected process in an illustrative embodiment.
Figure 12:
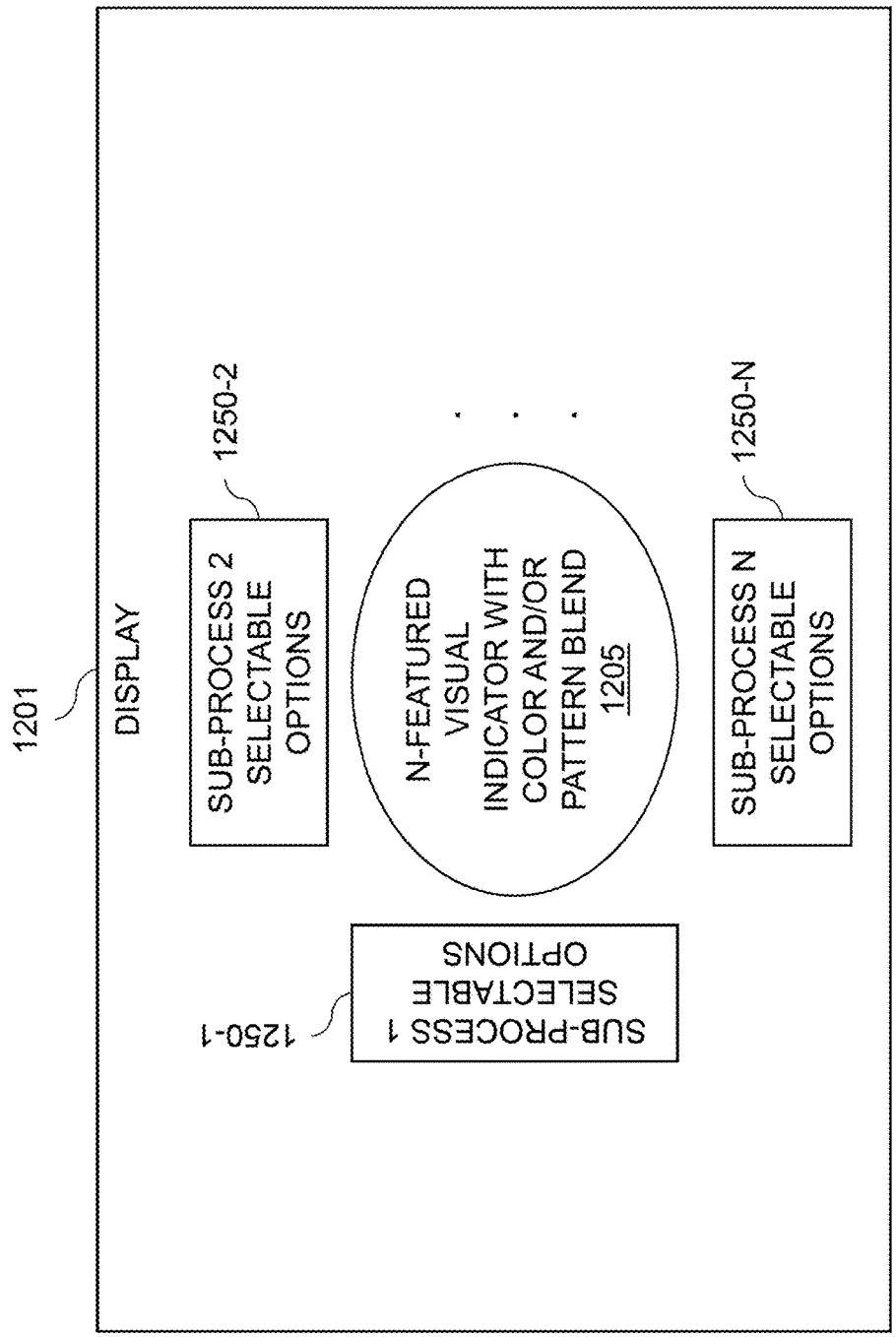
FIG. 12 shows a view of a display with a visual indicator having selectable options presented instead of sub-processes of a selected process in an illustrative embodiment.

FIGS. 10-12 show views 1000, 1100 and 1200, respectively, of a client device after a process has been selected by a user of a client device. In some embodiments, the views 1000, 1100 and 1200 are presented responsive to user selection of one of the candidate processes 902 on the display 901 of view 900. In other embodiments, the views 1000, 1100 and 1200 may be presented responsive to direct user navigation to the selected process (e.g., navigation to a product order page of an e-commerce website, opening an application on a client device, etc.). The views 1000, 1100 and 1200 of FIGS. 10-12 provide three alternatives for presentation of visual indicators. The view 1000 of FIG. 10 shows an N-featured visual indicator 1005 with a color and/or pattern blend that is presented on the display 1001 alongside the sub-processes 1003-1, 1003-2, . . . , 1003-N (collectively, tasks or sub-processes 1003) of a given process. In the FIG. 10 example, the N-featured visual indicator 1005 is presented for information purposes to provide a user viewing the display 1001 of the client device with upfront understanding of the complexity of the given process, or for currently selected options of different candidate processes.

The view 1100 of FIG. 11 shows an N-featured visual indicator 1105 with a color and/or pattern blend that is presented on the display 1101 alongside the sub-processes 1103-1, 1103-2, . . . , 1103-N (collectively, tasks or sub-processes 1103) of a given process. In addition, selectable options 1150-1, 1150-2, . . . , 1150-N (collectively, selectable options 1150) for each "feature" of the N-featured visual indicator 1105 are provided. For example, feature 1 of the N-featured visual indicator 1105 has associated selectable options 1150-1 for the sub-process 1103-1 of the given process. The selectable options 1150 are provided as user-selectable interface features (e.g., buttons, links, etc.) which will automatically complete the sub-processes 1103 using the selected input.

The view 1200 of FIG. 12 shows an N-featured visual indicator 1205 with a color and/or pattern blend that is presented on the display 1201 replacing the sub-processes of a given process. Similar to FIG. 11, the N-featured visual indicator 1205 includes selectable options 1250-1, 1250-2, . . . , 1250-N (collectively, selectable options 1250) for each "feature" of the N-featured visual indicator 1205. The process is completed by user interaction with the selectable options 1250 to complete the tasks or sub-processes of the given process.

Exemplary use case scenarios will now be detailed with respect to FIGS. 13-16, which show views 1300, 1400, 1500 and 1600, respectively, of a display of a client device utilizing visual indicators in e-commerce applications. It is to be appreciated, however, that embodiments are not limited to use of visual indicators for e-commerce applications, and may instead be used for various other applications in which it is desired to provide representations of complexity of processes, configurations, etc.

Figure 13:
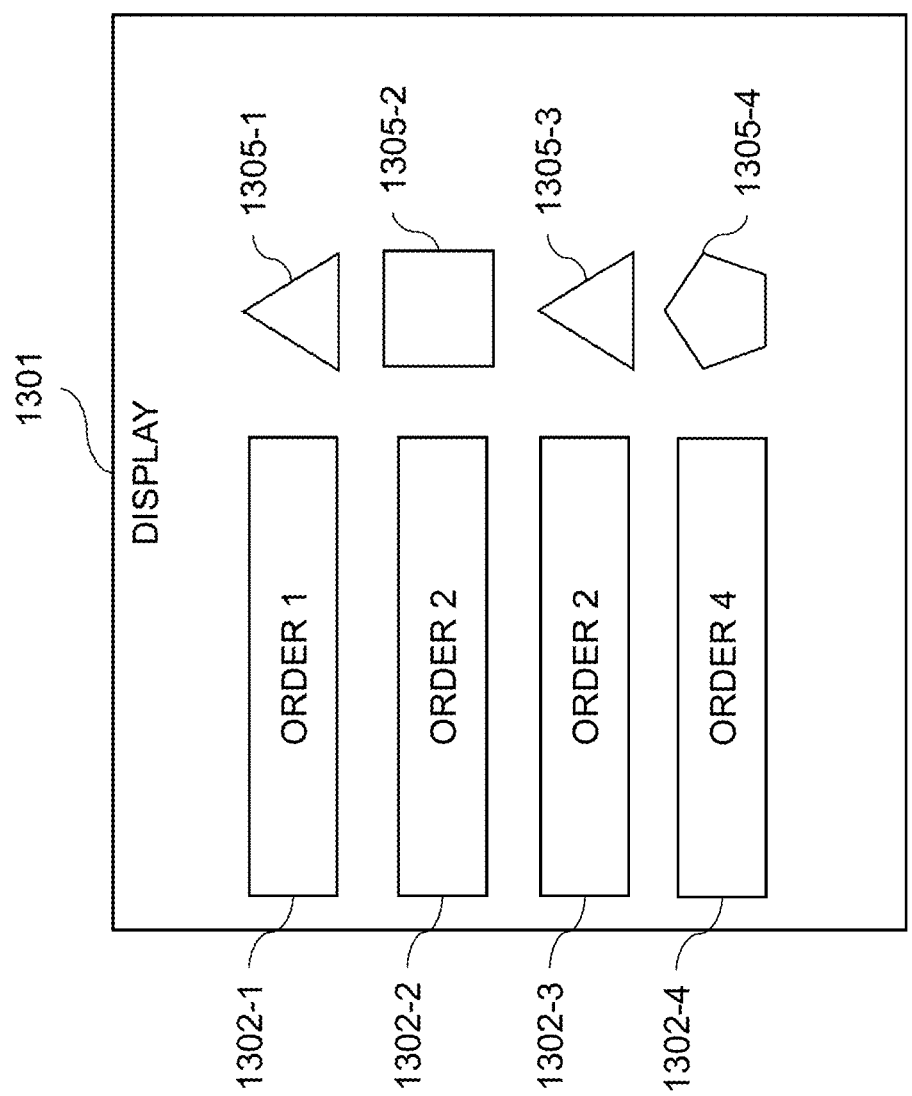
FIG. 13 shows a view of a display with visual indicators representing complexities of different candidate orders in an illustrative embodiment.

FIG. 13 shows view 1300 of a display 1301 with a number of different orders 1302-1, 1302-2, 1302-3 and 1302-4 (collectively, orders 1302). The orders 1302 may represent different quotes for products, with different quotes having different associated complexities. For example, order 1302-1 and 1302-3 have complexity of three, with order 1302-2 having complexity of four and order 1304-4 having complexity of five, represented by the number of sides of the visual indicators 1305-1, 1305-2, 1305-3, and 1305-4 (collectively, visual indicators 1305) presented alongside the orders 1302. In some embodiments, the display 1301 may illustrate orders in a user's shopping cart or other checkout application, with a color and/or pattern blend of the visual indicators 1305 representing selected options for the orders 1302 (e.g., different color or pattern blends represent different combinations of payment or billing information, address information, delivery or shipping method, etc.).

The different complexities of the orders 1302 may be based on different types of purchasing requirements. For example, the orders 1302-1 and 1302-3 may represent basic purchase orders, requiring steps for entry of (1) billing, (2) address and (3) shipping options. The order 1302-2 may have higher complexity representing a purchase order which qualifies for a special discount (e.g., an educational discount), requiring steps for entry of (1) billing, (2) address, and (3) shipping options, as well as entry of (4) proof of qualifying status for the special discount. The order 1302-4 may represent an even more complex purchase order, requiring steps for entry of (1) billing, (2) address, and (3) shipping options, entry of (4) proof of qualifying status for a special discount, and entry of (5) tax status information (e.g., qualification for tax exempt status, etc.). It should be noted that the above options are presented by way of example only, and that purchase orders need not necessarily utilize the same tasks or steps described above, or may utilize various other tasks or steps in addition to or in place of one or more of the above-described tasks or steps.

Figure 14:
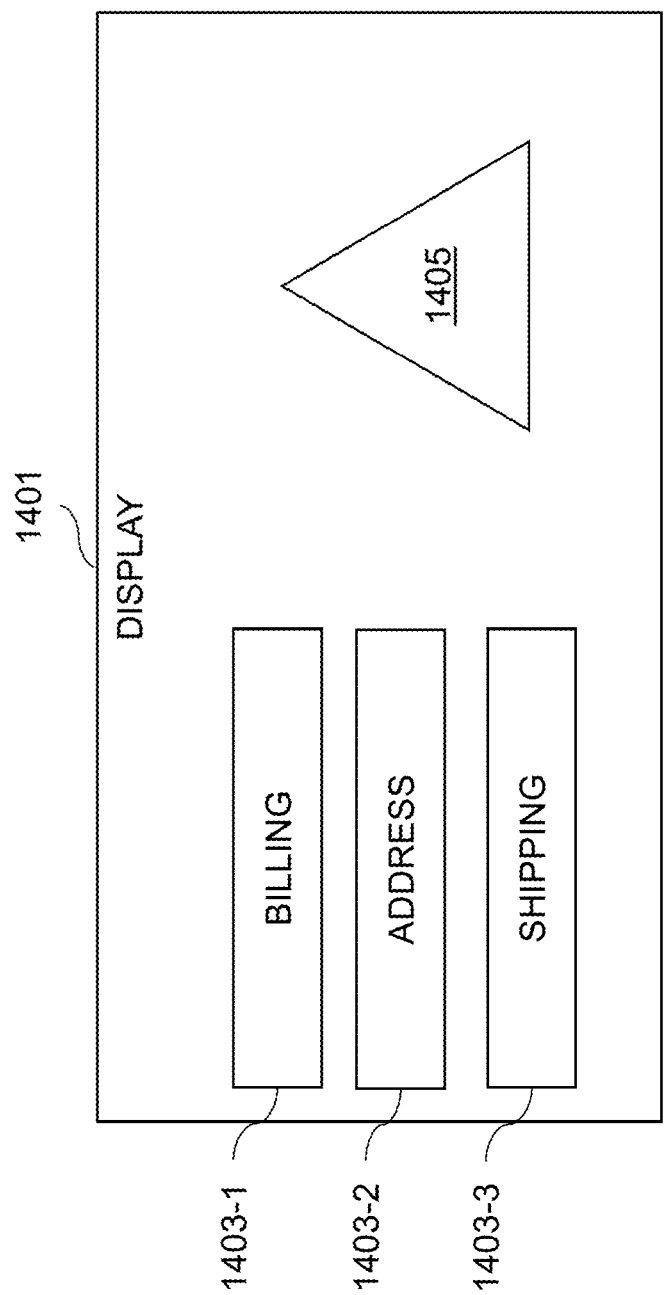
FIG. 14 shows a view of a display with a visual indicator presented along with entry fields of a selected order in an illustrative embodiment.

FIG. 14 shows view 1400 of a display 1401 illustrating entry fields for billing 1403-1, address 1403-2 and shipping 1403-3 information (collectively, entry fields 1403). The entry fields 1403 represent steps of a selected process, such as completing a purchase on an e-commerce website. This process may be selected via selection of one of the candidate orders 1302 from the display 1301, or may be navigated to in another manner. Also shown in view 1400 of the display 1401 is a visual indicator 1405, having three sides representing the three tasks or sub-processes (e.g., one side for each of the entry fields 1403). The visual indicator 1405 is presented alongside the entry fields 1403, and provides an indication to a user viewing the display 1401 the complexity of the process being performed. A color and/or pattern blend of the visual indicator 1405 may indicate the types of information required in entry fields 1403, or the currently selected input for entry fields 1403.

Figure 15:
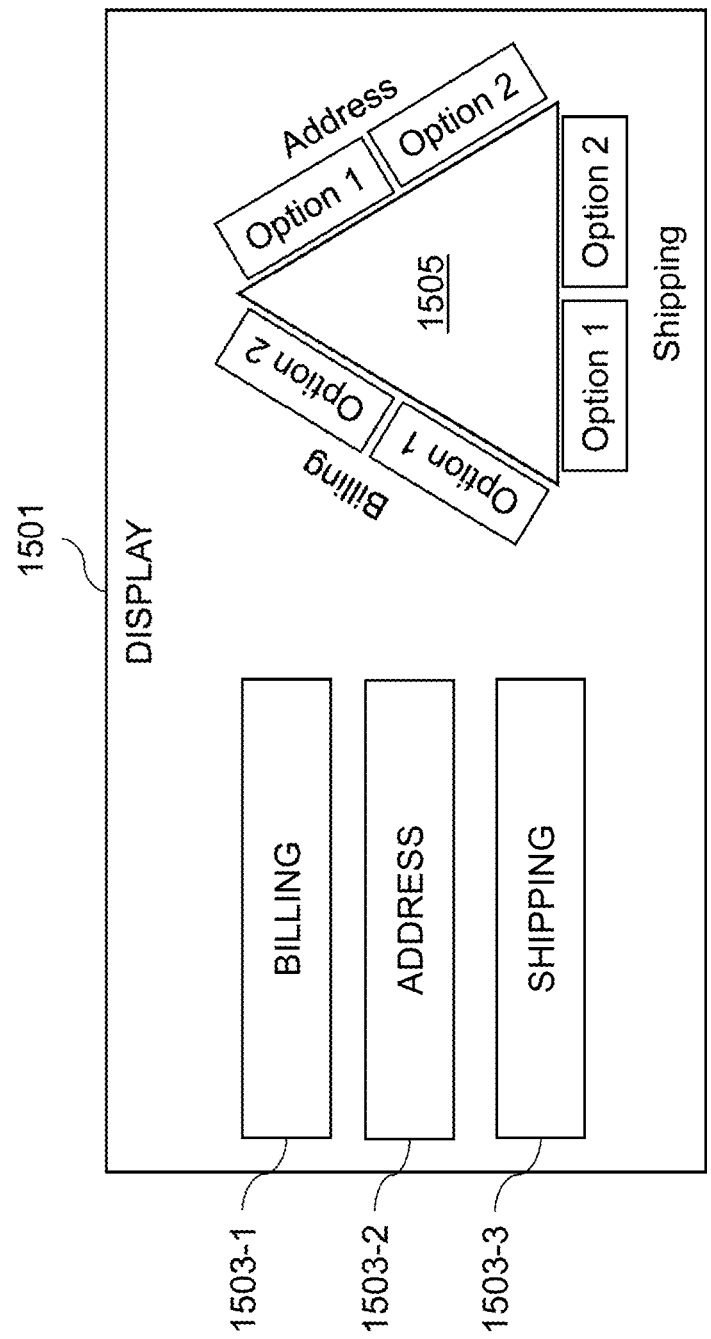
FIG. 15 shows a view of a display with a visual indicator having selectable options presented along with entry fields of a selected order in an illustrative embodiment.

FIG. 15 shows view 1500 of a display 1501 illustrating entry fields for billing 1503-1, address 1503-2 and shipping 1503-3 information (collectively, entry fields 1503). Similar to the entry fields 1403, the entry fields 1503 represent steps of a selected process such as completing a purchase on an e-commerce website. In the view 1500, visual indicator 1505 is present alongside the entry fields 1503. The visual indicator 1505, compared with visual indicator 1405, also includes user interface features for completing the tasks of the selected process (e.g., the "Option 1" and "Option 2" buttons which may be used to automatically fill the entry fields 1503 with billing, address and shipping information).

Figure 16:
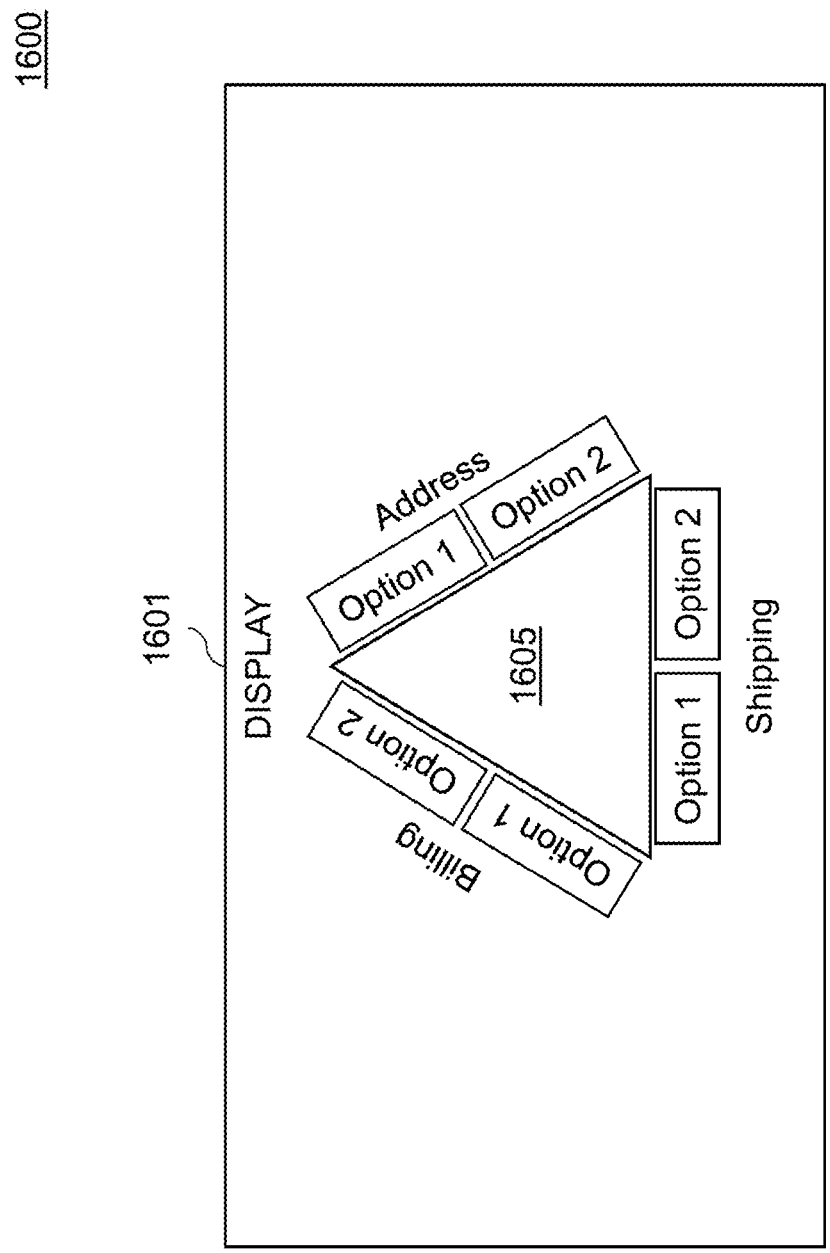
FIG. 16 shows a view of a display with a visual indicator having selectable options presenting instead of entry fields of a selected order in an illustrative embodiment.

FIG. 16 shows view 1600 of a display 1601, where a visual indicator 1605 is presented to replace entry fields representing steps of a selected process. Thus, instead of presenting entry fields 1403/1503, the view 1600 of display 1601 instead presents the visual indicator 1605 having the user-selectable interface features for filling in the entry fields (e.g., the "Option 1" and "Option 2" buttons which may be used to automatically fill the entry fields with billing, address and shipping information).

Embodiments provide advantages for various different use cases. In task management, the use of visual indicators as described herein may be used to represent the progress made in various pieces of work, and may be used to highlight complex processes. E-commerce applications, such as cart or checkout processes on websites, may use visual indicators to present the checkout or purchase process in an intuitive format for the user, offering easy recognition of selections.

Visual indicators described herein may also be used to make existing processes or tasks more accessible for users with accessibility needs. For example, the use of color and/or pattern blends may make menus more accessible and intuitive, particularly for users with disabilities or specific medical needs. A range of unique colors and/or patterns may be used to represent complex orders or configurations, creating process identifiers that allow for immediate recreation of an order or configuration. The visual indicators may also be used to quickly highlight points of failure in a system, such as by providing identifiable error colors or patterns in the color and/or pattern blends of visual indicators.

Visual indicators described herein may also be used for capturing the level of complexity of processes to help developers or system architects to improve existing processes in day to day work, or in applications that are developed. As an example, consider a tax payment process. If represented with an octagon visual indicator this provides an indication that there are eight steps in the process and thus complex for a user. A developer seeing the visual indicator indicating such a complex process may be motivated to provide design improvements to simplify the process for the user during development.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the visual indicator interface 102 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 17 and 18. Although described in the context of system 100, these platforms may also be used to implement at least portions of other information processing systems in other embodiments.

Figure 17:
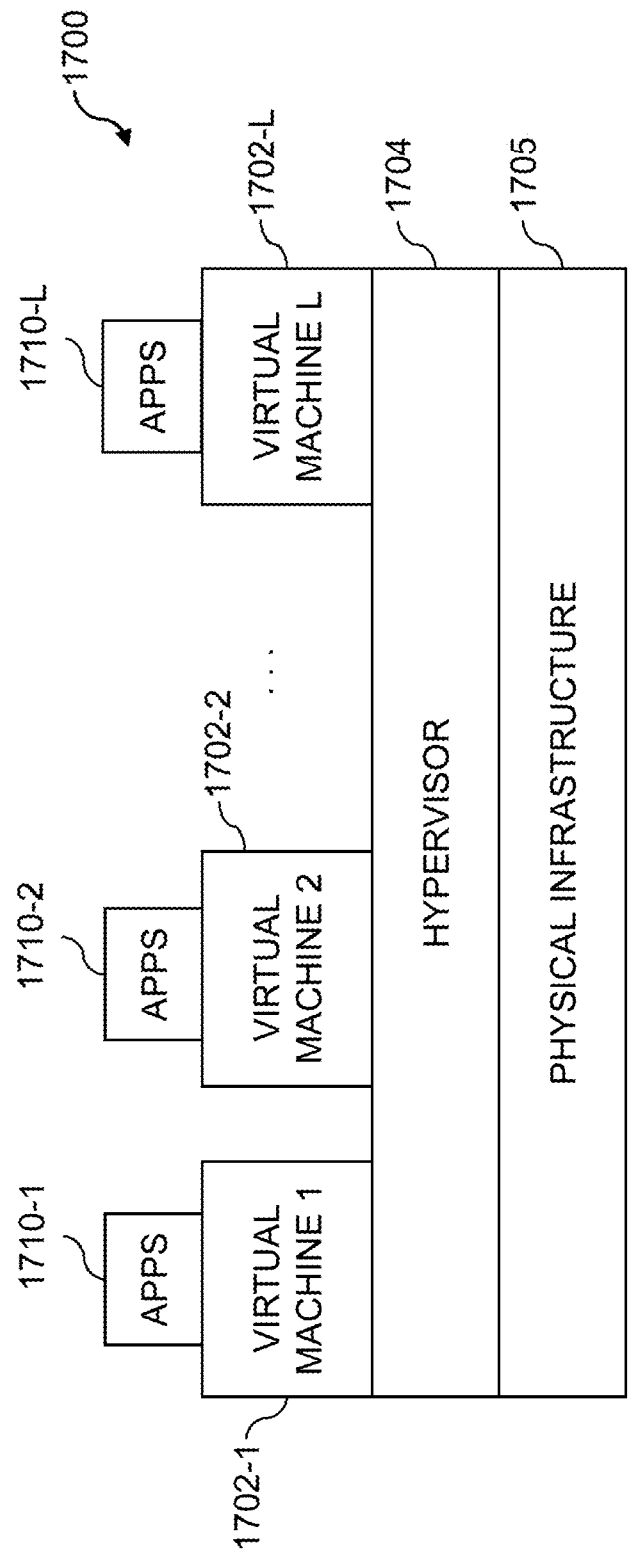
FIGS. 17 and 18 show examples of processing platforms that may be utilized to implement at least a portion of an information processing system in illustrative embodiments.
Figure 18:
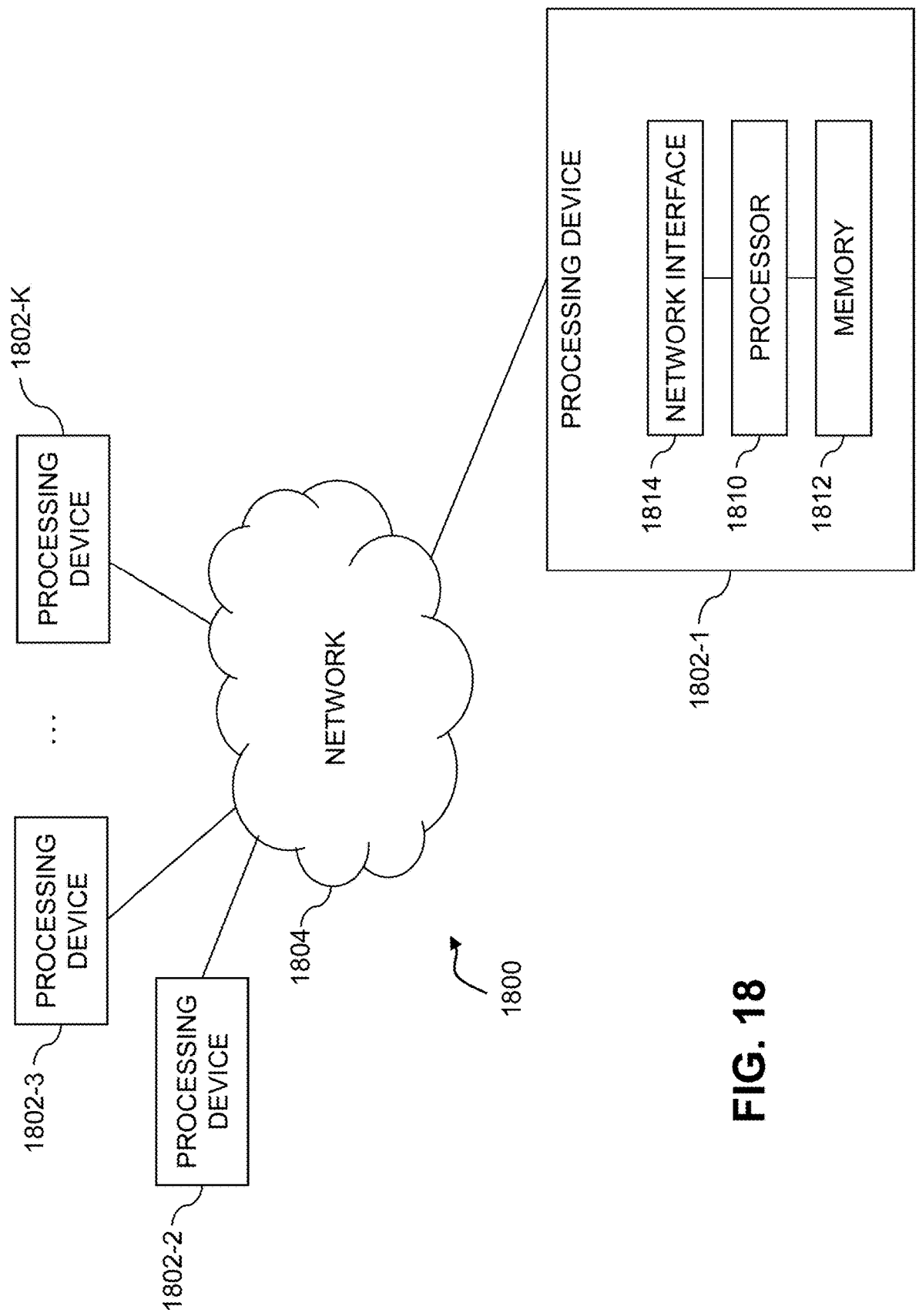

FIG. 17 shows an example processing platform comprising cloud infrastructure 1700. The cloud infrastructure 1700 comprises a combination of physical and virtual processing resources that may be utilized to implement at least a portion of the information processing system 100. The cloud infrastructure 1700 comprises virtual machines (VMs) 1702-1, 1702-2, . . . , 1702-L implemented using a hypervisor 1704. The hypervisor 1704 runs on physical infrastructure 1705. The cloud infrastructure 1700 further comprises sets of applications 1710-1, 1710-2, . . . , 1710-L running on respective ones of the virtual machines 1702-1, 1702-2, . . . , 1702-L under the control of the hypervisor 1704.

Although only a single hypervisor 1704 is shown in the embodiment of FIG. 17, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . , 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA) or other type of processing circuitry, as well as portions or combinations of such circuitry elements.

The memory 1812 may comprise random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of visual indicators, color and shape combinations, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   identifying one or more processes presented on a display of a given client device;
   determining a complexity of at least a given one of the one or more processes, wherein determining the complexity of the given process comprises determining a number of tasks of the given process;
   generating a given visual indicator of the complexity of the given process, the given visual indicator comprising a shape with a number of features, wherein the shape comprises an N-featured shape and the number of features of the N-featured shape is equal to the number of tasks of the given process, and the complexity is based, at least in part, on the number of features of the N-featured shape;
   providing the given visual indicator for presentation on the display of the given client device in association with the given process; and
   determining a selection by a user of at least one of the one or more processes in response to a level of complexity indicated by the visual indicator;
   wherein the N-featured shape comprises one of:
   a star with a number of points of the star being equal to the number of tasks of the given process;
   a hub with a number of the spokes being equal to the number of tasks of the given process; and
   a polygon with a number of sides being equal to the number of tasks of the given process;
   wherein the given visual indicator further comprises at least one of a color and a pattern based at least in part on its associated task of the given process;
   wherein the method is performed by at least one processing device comprising a processor coupled to a memory.

2. The method of claim 1, wherein the given visual indicator has at least one of a color blend and a pattern blend of the colors and patterns of each feature of the given visual indicator.

3. The method of claim 2, further comprising dynamically updating at least one of the color blend and the pattern blend of the given visual indicator responsive to changes in tasks of the given process.

4. The method of claim 3, wherein dynamically updating said at least one of the color blend and the pattern blend comprises changing a color or pattern of the given visual indicator to at least one of a predefined color and a predefined pattern recognizable to a user of the given client device in response to one or more designated types of changes in the tasks of the given process.

5. The method of claim 4, wherein the predefined color and the predefined pattern represent an error or unexpected result of the given process.

6. The method of claim 1, further comprising dynamically updating at least one of the color and the pattern of a given feature of the given visual indicator responsive to a change in a given task of the given process associated with the given feature.

7. The method of claim 4, wherein the change in the task of the given process comprises one or more of:
   selection between two or more options for the given task of the given process; and
   completing the given task of the given process.

8. The method of claim 1, wherein the N-featured shape further comprises:
   a flower with a number of petals being based on the number of tasks of the given process.

9. The method of claim 1, wherein providing the given visual indicator for presentation on the display of the given client device in association with the given process comprises presenting the given visual indicator along with one or more tasks of the given process.

10. The method of claim 9, wherein the given visual indicator comprises one or more user interface features associated with one or more sides of the given visual indicator, each of the user interface features comprising a user-selectable option for completing an associated task of the given process.

11. The method of claim 1, wherein providing the given visual indicator for presentation on the display of the given client device in association with the given process comprises presenting the given visual indicator in place of one or more tasks of the given process, and wherein the given visual indicator further comprises one or more user interface features associated with one or more sides of the given visual indicator, each of the user interface features comprising a user-selectable option for completing an associated task of the given process.

12. The method of claim 1, wherein providing the given process comprises a purchase order, and wherein the number of tasks of the given process comprise a number of entry fields for the purchase order.

13. A computer program product comprising a non-transitory processor-readable storage medium having stored therein program code of one or more software programs, wherein the program code when executed by at least one processing device cause the at least one processing device:
   to identify one or more processes presented on a display of a given client device;
   to determine a complexity of at least a given one of the one or more processes, wherein determining the complexity of the given process comprises determining a number of tasks of the given process;
   to generate a given visual indicator of the complexity of the given process, the given visual indicator comprising a shape with a number of features, wherein the shape comprises an N-featured shape and the number of features of the N-featured shape is equal to the number of tasks of the given process, and the complexity is based, at least in part, on the number of features of the N-featured shape;
   to provide the given visual indicator for presentation on the display of the given client device in association with the given process; and
   to determine a selection by a user of at least one of the one or more processes in response to a level of complexity indicated by the visual indicator;
   wherein the N-featured shape comprises one of:
      a star with a number of points of the star being equal to the number of tasks of the given process;
      a hub with a number of the spokes being equal to the number of tasks of the given process; and
      a polygon with a number of sides being equal to the number of tasks of the given process;
   wherein the given visual indicator further comprises at least one of a color and a pattern based at least in part on its associated task of the given process.

14. The computer program product of claim 13, wherein:
   the given visual indicator has at least one of a color blend and a pattern blend of the colors and patterns of each feature of the given visual indicator.

15. The computer program product of claim 14, wherein the program code when executed further causes the at least one processing device to dynamically update at least one of the color blend and the pattern blend of the given visual indicator responsive to changes in tasks of the given process.

16. An apparatus comprising:
   at least one processing device comprising a processor coupled to a memory;
   the at least one processing device being configured:
   to identify one or more processes presented on a display of a given client device;
   to determine a complexity of at least a given one of the one or more processes, wherein determining the complexity of the given process comprises determining a number of tasks of the given process;
   to generate a given visual indicator of the complexity of the given process, the given visual indicator comprising a shape with a number of features, wherein the shape comprises an N-featured shape and the number of features of the N-featured shape is equal to the number of tasks of the given process, and the complexity is based, at least in part, on the number of features of the N-featured shape;
   to provide the given visual indicator for presentation on the display of the given client device in association with the given process; and
   to determine a selection by a user of at least one of the one or more processes in response to a level of complexity indicated by the visual indicator;
   wherein the N-featured shape comprises one of:
      a star with a number of points of the star being equal to the number of tasks of the given process;
      a hub with a number of the spokes being equal to the number of tasks of the given process; and
      a polygon with a number of sides being equal to the number of tasks of the given process;
   wherein the given visual indicator further comprises at least one of a color and a pattern based at least in part on its associated task of the given process.

17. The apparatus of claim 16, wherein:
   the given visual indicator has at least one of a color blend and a pattern blend of the colors and patterns of each feature of the given visual indicator.

18. The apparatus of claim 17, wherein the at least one processing device is further configured to dynamically update at least one of the color blend and the pattern blend of the given visual indicator responsive to changes in tasks of the given process.

19. The apparatus of claim 17, wherein dynamically updating said at least one of the color blend and the pattern blend comprises changing a color or pattern of the given visual indicator to at least one of a predefined color and a predefined pattern recognizable to a user of the given client device in response to one or more designated types of changes in the tasks of the given process.

20. The apparatus of claim 16, wherein the given visual indicator comprises one or more user interface features associated with one or more sides of the given visual indicator, each of the user interface features comprising a user-selectable option for completing an associated task of the given process.

\* \* \* \* \*